US012619046B2

(12) United States Patent
Weng et al.

(10) Patent No.: US 12,619,046 B2
(45) Date of Patent: May 5, 2026

(54) OPTICAL SYSTEM

(71) Applicant: Actutek Corporation, Taoyuan City (TW)

(72) Inventors: Chih-Wei Weng, Taoyuan City (TW); Chao-Chang Hu, Taoyuan City (TW); Yung-Hsien Yeh, Taoyuan City (TW); Mao-Kuo Hsu, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 860 days.

(21) Appl. No.: 17/706,938

(22) Filed: Mar. 29, 2022

(65) Prior Publication Data

US 2022/0308358 A1 Sep. 29, 2022

Related U.S. Application Data

(60) Provisional application No. 63/299,616, filed on Jan. 14, 2022, provisional application No. 63/167,300, filed on Mar. 29, 2021.

(51) Int. Cl.
| | |
|---|---|
| *G02B 7/02* | (2021.01) |
| *G02B 1/00* | (2006.01) |
| *G02B 27/64* | (2006.01) |

(52) U.S. Cl.
CPC .............. *G02B 7/02* (2013.01); *G02B 1/002* (2013.01); *G02B 27/646* (2013.01)

(58) Field of Classification Search
CPC ... G03B 5/00; G03B 3/00; G03B 3/14; G03B 5/02; G03B 5/06; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092; G02B 27/646; G02B 6/3514; G02B 7/08; G02B 7/09; G02B 7/182; G02B 15/173; G02B 15/14; G02B 15/177; G02B 15/22; G02B 15/16;

(Continued)

(56) References Cited

U.S. PATENT DOCUMENTS

2017/0254978 A1* 9/2017 Chong ..................... G02B 7/09
2018/0239217 A1* 8/2018 Konuma .................. G02B 7/04
(Continued)

FOREIGN PATENT DOCUMENTS

CN 107924105 A 4/2018

OTHER PUBLICATIONS

An Office Action in corresponding CN Application No. 202210324170.X dated Feb. 7, 2026 is attached, 6 pages.

*Primary Examiner* — Stephone B Allen
*Assistant Examiner* — Tamara Y. Washington
(74) *Attorney, Agent, or Firm* — MUNCY, GEISSLER, OLDS & LOWE, P.C.

(57) ABSTRACT

An optical system is provided. The optical system includes a fixed unit, an actuating unit, a lens unit and a metalens. The actuating unit is connected to the fixed unit. The lens unit is adapted to be moved by the actuating unit relative to the fixed unit. The metalens is adapted to be moved between a first position and a second position relative to the lens unit. When the metalens is in the first position, the metalens is not on a light path of the lens unit. When the metalens is in the second position, the metalens is on the light path of the lens unit.

12 Claims, 12 Drawing Sheets

L1

S1

(58) Field of Classification Search
CPC ...... G02B 13/18; G02B 13/009; G02B 27/64;
G02B 13/02; G02B 7/04; G02B 13/0015;
G02B 15/15; G02B 13/0045; G02B
15/17; G02B 15/20; G02B 27/0025;
G02B 9/62; G02B 13/04; G02B 7/023;
G02B 9/64; G02B 13/001; G02B
13/0065; G02B 15/10; G02B 15/163;
G02B 15/167; G02B 23/02; G02B 7/02;
G02B 7/022; G02B 7/102; G02B 7/14;
G02B 9/04; G02B 9/34; G02B 9/60;
G02B 13/002; G02B 13/004; G02B
13/06; G02B 13/16; G02B 15/12; G02B
15/161; G02B 17/08; G02B 17/0804;
G02B 17/0808; G02B 17/0896; G02B
21/26; G02B 23/08; G02B 26/004; G02B
26/0808; G02B 26/0816; G02B 27/0911;
G02B 27/644; G02B 3/14; G02B 7/021;
G02B 7/025; G02B 7/18; G02B 7/24;
G02B 7/28; G02B 9/00; G02B 9/24;
H04N 5/23287; H04N 5/2252; H04N
5/2254; H04N 5/2329; H04N 5/2257;
H04N 5/2253; H04N 5/23248; H04N
5/2328; H04N 5/225; H04N 5/232; H04N
5/23209; H04N 5/23212; H04N 5/23245;
H04N 5/23258; H04N 5/23264; H04N
13/0203; H04N 13/0239; H04N 13/0296;
H04N 5/222; H04N 5/228; H04N
5/23229; H04N 5/23251; H04N 5/23254;
H04N 5/23261; H04N 5/23274; H04N
5/238; H04N 23/58; H04N 23/687; H04N
23/55; H02K 41/0356
See application file for complete search history.

(56) References Cited

U.S. PATENT DOCUMENTS

2020/0174163 A1*  6/2020  Han ...................... G02B 1/002
2021/0396910 A1*  12/2021  Zhu ...................... G02B 5/1809

* cited by examiner

S1

L2

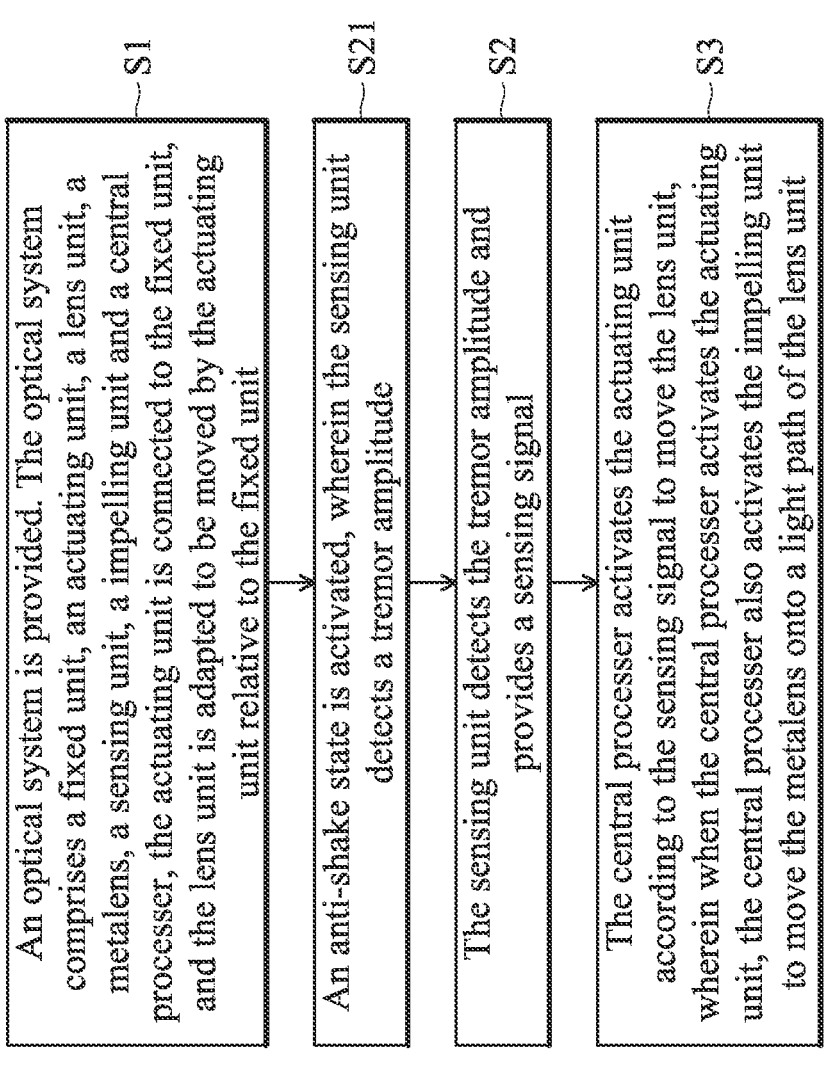

An optical system is provided. The optical system comprises a fixed unit, an actuating unit, a lens unit, a metalens, a sensing unit, a impelling unit and a central processer, the actuating unit is connected to the fixed unit, and the lens unit is adapted to be moved by the actuating unit relative to the fixed unit

S1

An anti-shake state is activated, wherein the sensing unit detects a tremor amplitude

S21

The sensing unit detects the tremor amplitude and provides a sensing signal

S2

The central processer activates the actuating unit according to the sensing signal to move the lens unit, wherein when the central processer activates the actuating unit, the central processer also activates the impelling unit to move the metalens onto a light path of the lens unit

OPTICAL SYSTEM

CROSS REFERENCE TO RELATED APPLICATIONS

This application claims the benefit of U.S. Provisional Application No. 63/167,300, filed Mar. 29, 2021, and U.S. Provisional Application No. 63/299,616, filed Jan. 14, 2022, the entirety of which are incorporated by reference herein.

BACKGROUND OF THE INVENTION

Field of the Invention

The present invention relates to an optical system, and in particular to an optical system with an optical image stabilization (OIS) function.

Description of the Related Art

In the conventional optical system with the optical image stabilization (OIS) function, the lens unit is moved to provide the optical compensation, and the image of the optical system is stabilized. However, after the movement of the lens unit, the light path is still displaced, and the image quality is deteriorated. Particularly, if the anti-shake optical compensation is provided in a central compensation way, the imaging quality of the peripheral portion of the image will be poor. If the anti-shake optical compensation is provided in a peripheral compensation way, the imaging quality of the central portion of the image will be poor.

In order to overcome the above-mentioned defects, the anti-shake optical compensation is provided in the central compensation way, and the size of the lens unit is increased to improve the quality of the whole image. However, the size and the cost of the lens unit and its peripheral components are increased, which is not conducive to the requirements of a thin and low-cost product.

BRIEF SUMMARY OF THE INVENTION

Embodiments of the invention are provided to address the aforementioned difficulty.

In one embodiment, an optical system is provided. The optical system includes a fixed unit, an actuating unit and a lens unit. The actuating unit is connected to the fixed unit. The lens unit is adapted to be moved by the actuating unit relative to the fixed unit.

In one embodiment, the optical system further comprises a metalens. The metalens is adapted to be moved between a first position and a second position relative to the lens unit. When the metalens is in the first position, the metalens is not on a light path of the lens unit. When the metalens is in the second position, the metalens is on the light path of the lens unit.

In one embodiment, the metalens is rotated between the first position and the second position.

In one embodiment, the optical system further comprises a impelling unit. The metalens is connected to the impelling unit. The impelling unit is adapted to rotate the metalens between the first position and the second position.

In one embodiment, the impelling unit comprises a magnetic member and a coil, the metalens is connected to the magnetic member, the coil is adapted to apply a magnetic field to the magnetic member, and the magnetic member moves the metalens between the first position and the second position.

In one embodiment, the lens unit comprises an inlet side, and when the metalens is in the second position, the metalens covers the inlet side.

In one embodiment, the lens unit comprises an outlet side, and when the metalens is in the second position, the metalens covers the outlet side.

In one embodiment, the optical system further comprises an image sensor. When the metalens is in the second position, the metalens is located between the image sensor and the lens unit.

In one embodiment, the optical system further comprises a sensor unit and a central processer, the sensor unit is adapted to detect a tremor amplitude and to provide a sensing signal, and the central processer activates the actuating unit according to the sensing signal to move the lens unit, and when the central processer activates the actuating unit, the central processer also activates the impelling unit to move the metalens from the first position to the second position.

In one embodiment, the metalens is adapted to be disposed on a light path of the lens unit, the metalens comprises a central area, a peripheral area and a plurality of metastructures, the peripheral area surrounds the central area, the metastructures are selectively disposed in the central area or the peripheral area.

In one embodiment, the actuating unit moves the lens unit to provide an anti-shake optical compensation in a central compensation way, and the metastructures are only disposed in the peripheral area.

In one embodiment, the peripheral area comprises a first annular area and a second annular area, the first annular area surrounds the central area, the second annular area surrounds the first annular area, the metastructures comprise a plurality of first metastructures and a plurality of second metastructures, the first metastructures are disposed in the first annular area, the second metastructures are disposed in the second annular area, and a compensation ability of the first metastructures differs from a compensation ability of the second metastructures.

In one embodiment, a height of each first metastructure is the same with a height of each second metastructure.

In one embodiment, a width of each first metastructure is smaller than a width of each second metastructure.

In one embodiment, an arrangement density of the first metastructures is smaller than an arrangement density of the second metastructures.

In one embodiment, the actuating unit moves the lens unit to provide an anti-shake optical compensation in a peripheral compensation way, and the metastructures are only disposed in the central area.

In one embodiment, a diameter of the central area is $\frac{2}{5}$ of a diagonal length of the metalens.

In one embodiment, an anti-shake optical compensation method is provided, including the following steps. First, an optical system is provided. The optical system comprises a fixed unit, an actuating unit, a lens unit, a metalens, a sensing unit, a impelling unit and a central processer, the actuating unit is connected to the fixed unit, and the lens unit is adapted to be moved by the actuating unit relative to the fixed unit. Next, the sensing unit detects a tremor amplitude and provides a sensing signal. Then, the central processer activates the actuating unit according to the sensing signal to move the lens unit, wherein when the central processer activates the actuating unit, the central processer also activates the impelling unit to move the metalens onto a light path of the lens unit.

In one embodiment, the anti-shake optical compensation method further comprises the step of activating an anti-shake state, wherein the sensing unit detects the tremor amplitude.

In one embodiment, under the anti-shake state, the actuating unit moves the lens unit to provide an anti-shake optical compensation in a central compensation way, the metalens comprises a central area, a peripheral area and a plurality of metastructures, the peripheral area surrounds the central area, and the metastructures are only disposed in the peripheral area.

The metalens of the optical system of the embodiment of the invention provides the diffraction compensation effect, and improves the image quality of the optical system. Particularly, when the tremor amplitude is over a default value and the central processer moves the lens unit to provide an optical compensation effect, and the metal lens is moved to the light path of the lens unit simultaneously to provide the diffraction compensation effect, and the image quality of the optical system is therefore improved. When the tremor amplitude is not over a default value (no compensation requirement), the metal lens is out of the light path of the lens unit, and the image quality of the optical system is prevented from influenced by the metal lens. Utilizing the optical system of the embodiment of the invention, the size and the cost of the lens unit and its peripheral components are reduced, and the production requirements of thinness and low cost are achieved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 9 is a flowchart of an anti-shake optical compensation method of the embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
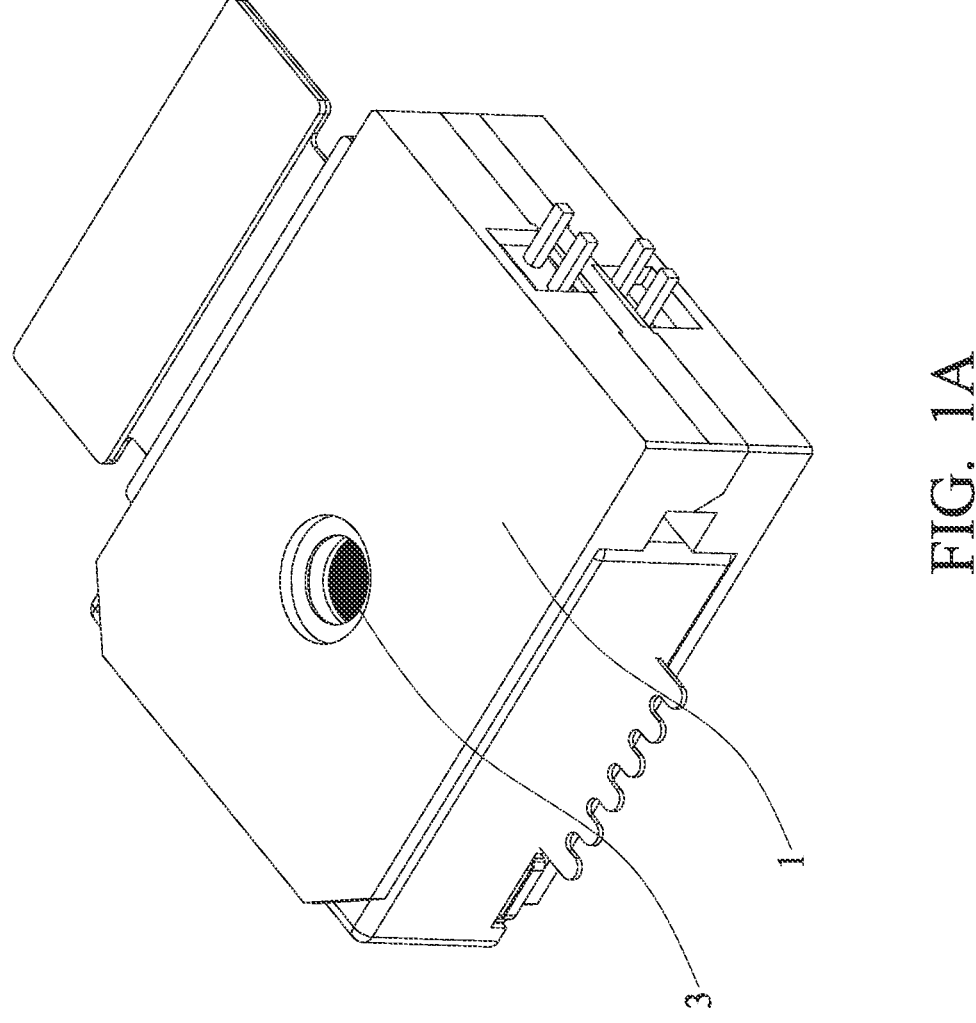
FIG. 1A is a perspective view of an optical system of a first embodiment of the invention.
Figure 1B:
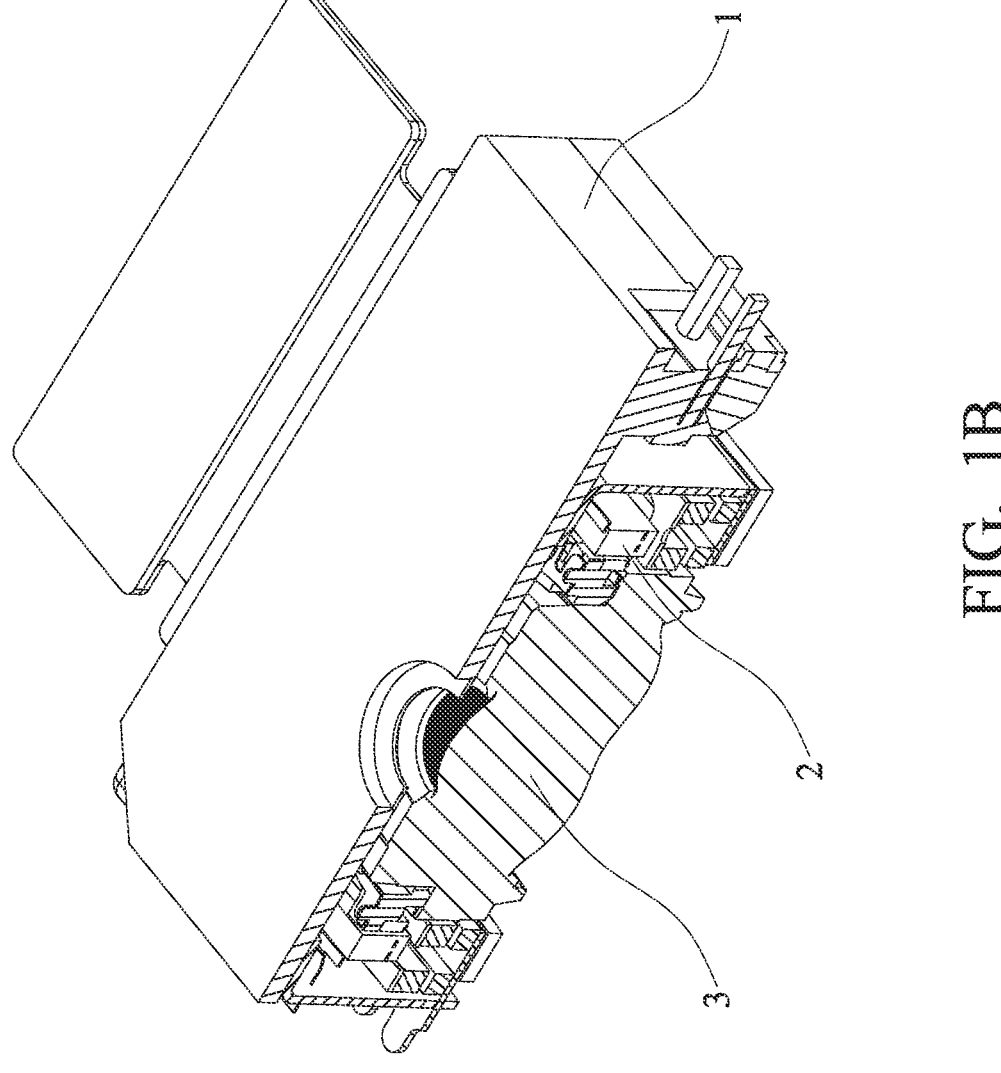
FIG. 1B is a cross sectional view of the optical system of the first embodiment of the invention.

FIG. 1A is a perspective view of an optical system of a first embodiment of the invention. FIG. 1B is a cross sectional view of the optical system of the first embodiment of the invention. With reference to FIGS. 1A and 1B, the optical system L1 of the embodiment of the invention includes a fixed unit 1, an actuating unit 2 and a lens unit 3. The actuating unit 2 is connected to the fixed unit 1. The lens unit 3 is adapted to be moved by the actuating unit 2 relative to the fixed unit 1.

In one embodiment of the invention, the fixed unit 1 can include a housing and a base. The actuating unit 2 can include a plurality of coils, at least one magnetic element, an elastic element. In one embodiment, the optical system L1 provides an optical image stabilization (OIS) function. The disclosure is not meant to restrict the invention.

Figure 2A:
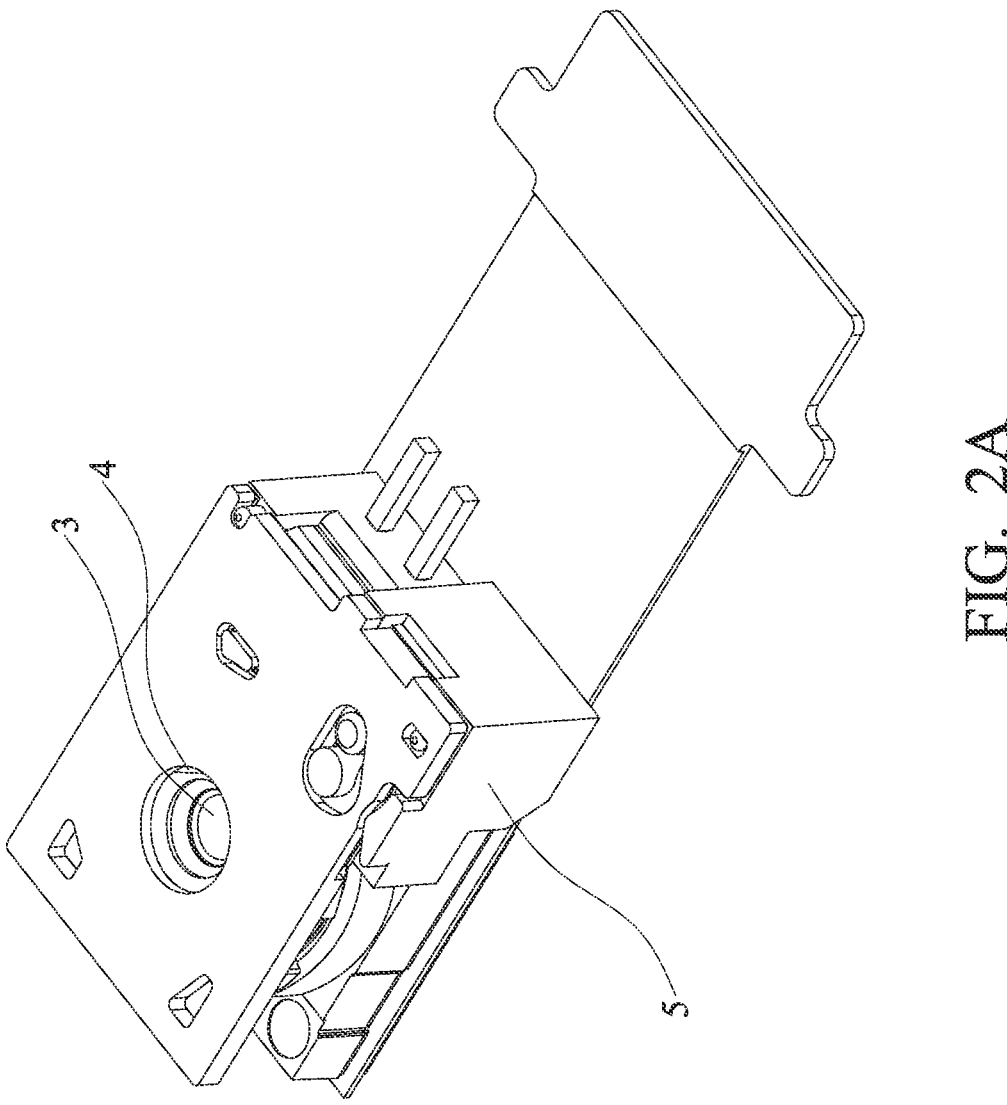
FIG. 2A shows an optical system of a second embodiment of the invention, wherein a metalens is in a first position.
Figure 2B:
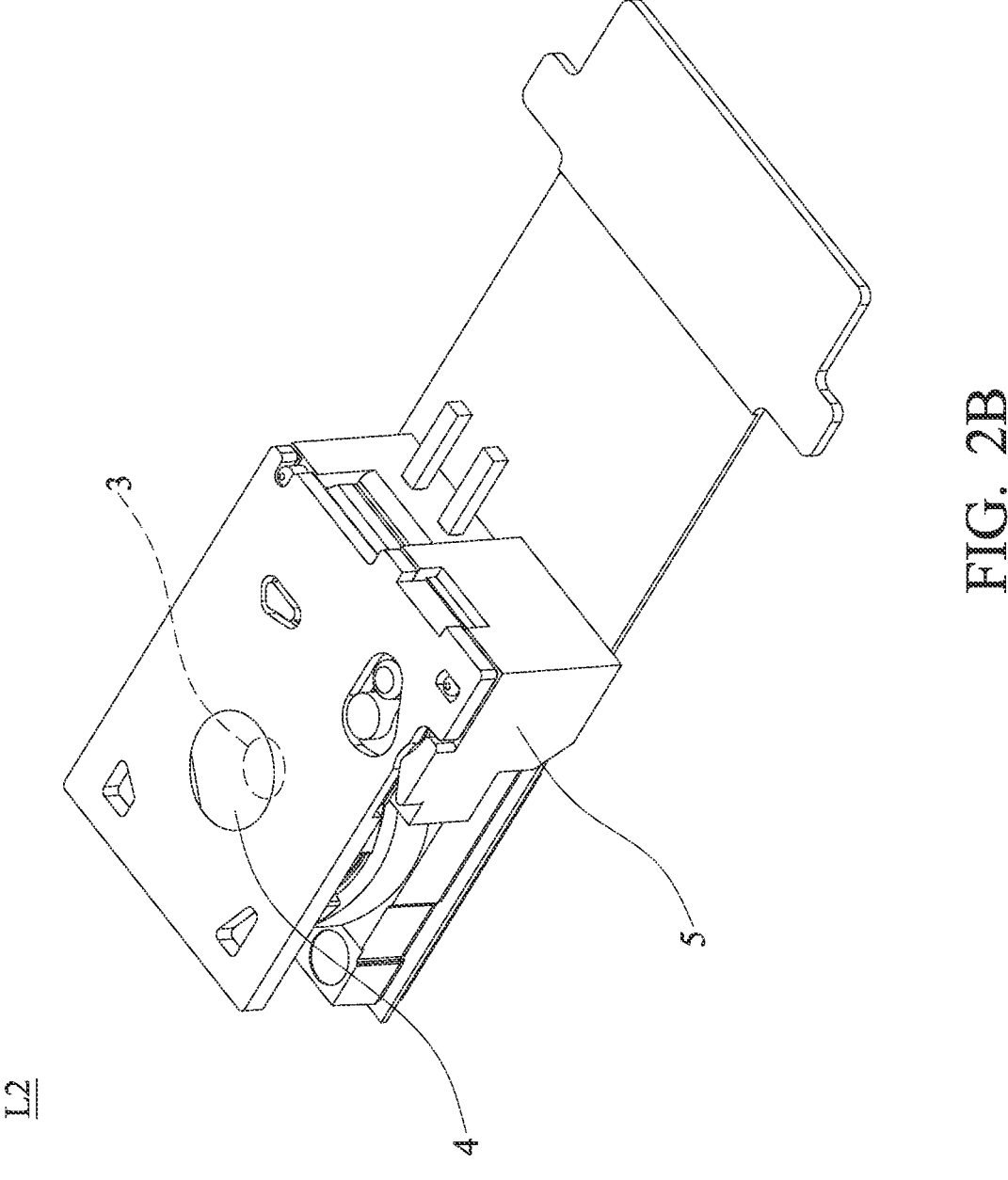
FIG. 2B shows the optical system of the second embodiment of the invention, wherein the metalens is in a second position.

FIG. 2A shows an optical system of a second embodiment of the invention, wherein a metalens is in a first position. FIG. 2B shows the optical system of the second embodiment of the invention, wherein the metalens is in a second position. With reference to FIGS. 2A and 2B, in one embodiment, the optical system L2 further comprises a metalens 4. The metalens 4 is adapted to be moved between a first position (FIG. 2A) and a second position (FIG. 2B) relative to the lens unit 3. When the metalens 4 is in the first position (FIG. 2A), the metalens 4 is not on a light path of the lens unit 3. When the metalens 4 is in the second position (FIG. 2B), the metalens is on the light path of the lens unit 3.

With reference to FIGS. 2A and 2B, in one embodiment, the metalens 4 is rotated between the first position and the second position.

With reference to FIGS. 2A and 2B, in one embodiment, the optical system L2 further comprises a impelling unit 5. The metalens 4 is connected to the impelling unit 5. The impelling unit 5 is adapted to rotate the metalens 4 between the first position and the second position.

Figure 3A:
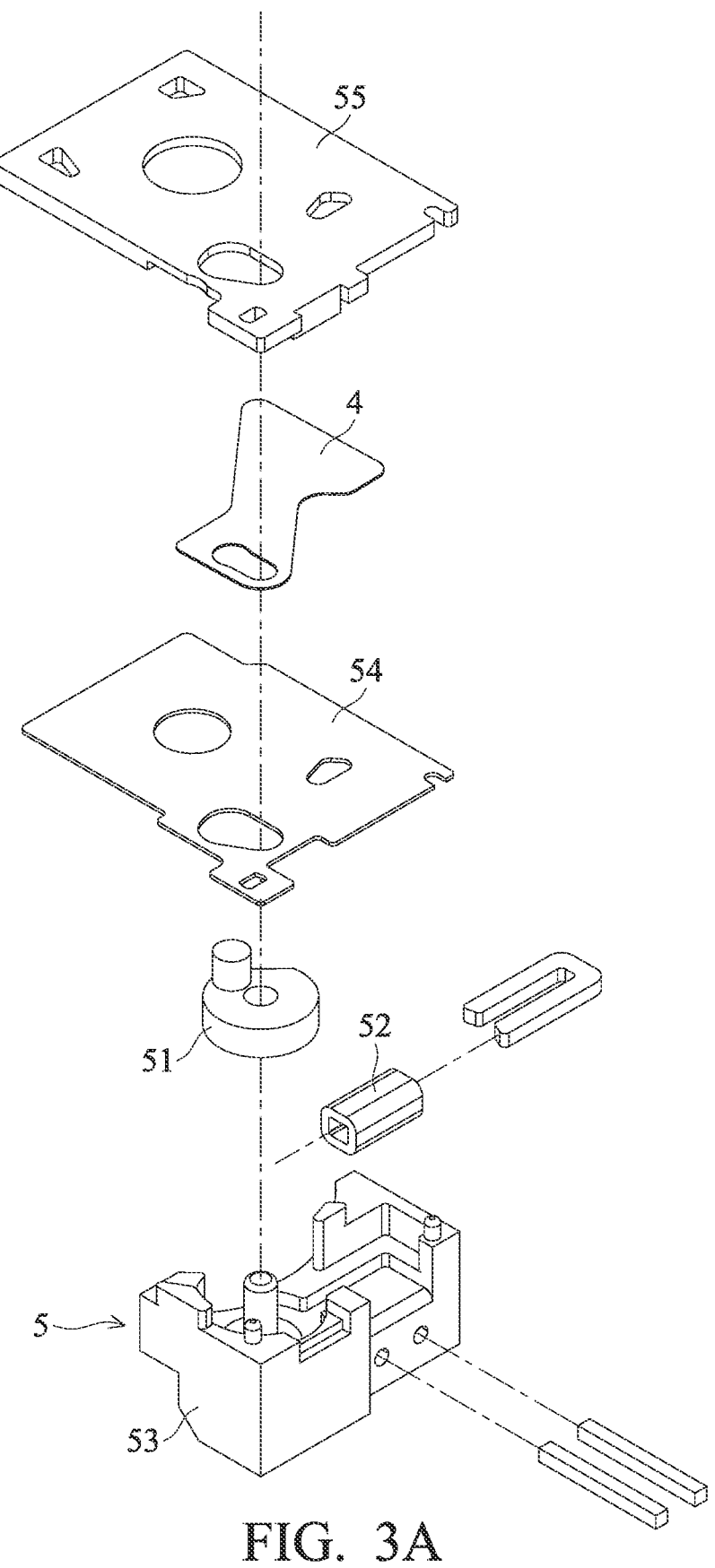
FIG. 3A is an exploded view of the impelling unit of the embodiment of the invention.
Figure 3B:
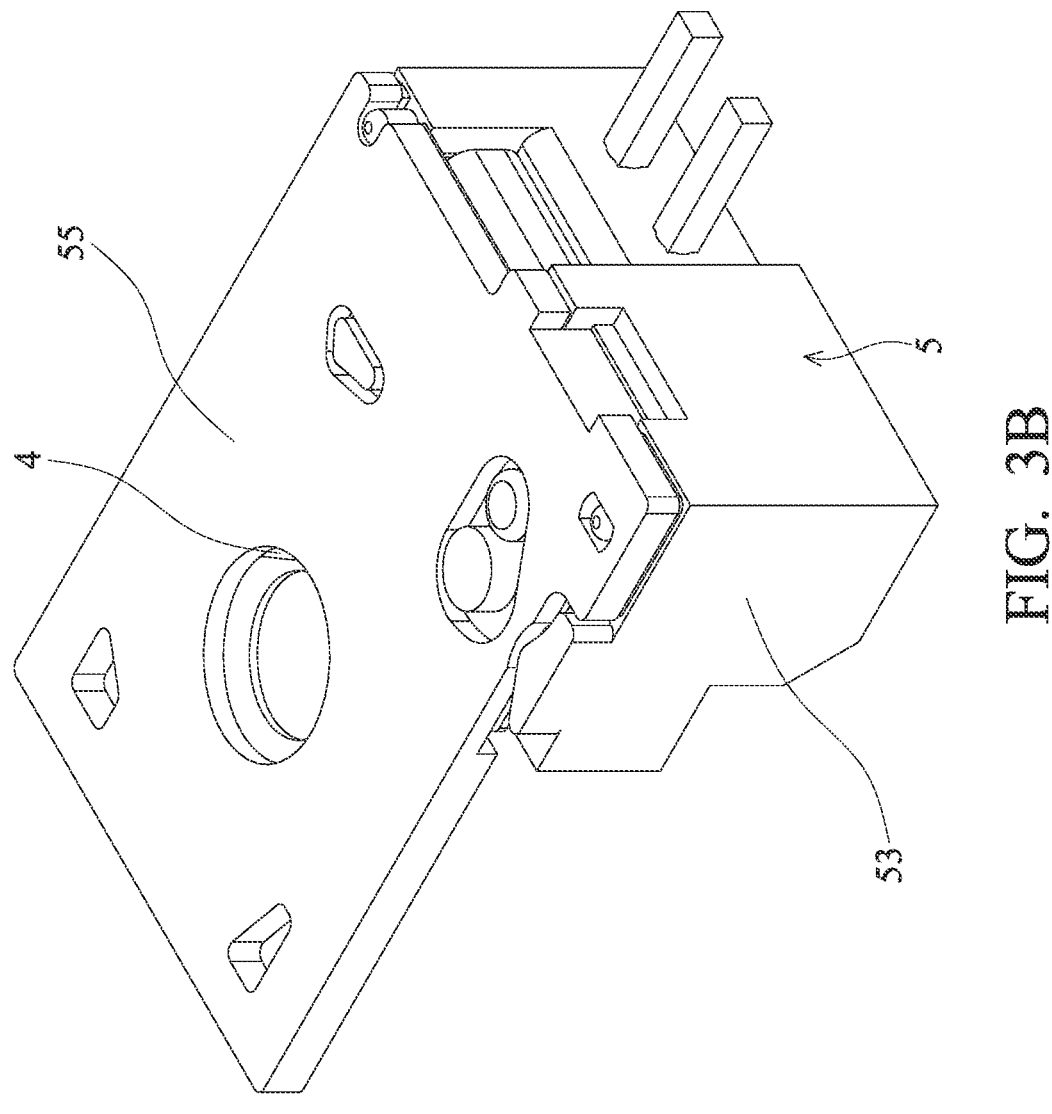
FIG. 3B is an assembled view of the impelling unit of the embodiment of the invention.

FIG. 3A is an exploded view of the impelling unit of the embodiment of the invention. FIG. 3B is an assembled view of the impelling unit of the embodiment of the invention, With reference to FIGS. 3A and 3B, in one embodiment, the impelling unit 5 comprises a magnetic member 51 and a coil 52. The metalens 4 is connected to the magnetic member 51. The coil 52 is adapted to apply a magnetic field to the magnetic member 51. The magnetic member 51 moves the metalens 4 between the first position and the second position.

With reference to FIGS. 3A and 3B, the impelling unit 5 further comprises a base 53, a supporting piece 54 and a cover 55. The coil 52 is affixed to the base 53. The supporting piece 54 and the cover 55 are affixed to the base 53. The magnetic member 51 pivots on the base 53. At least a portion of the metalens 4 is sandwiched between the supporting piece 54 and the cover 55.

Figure 4:
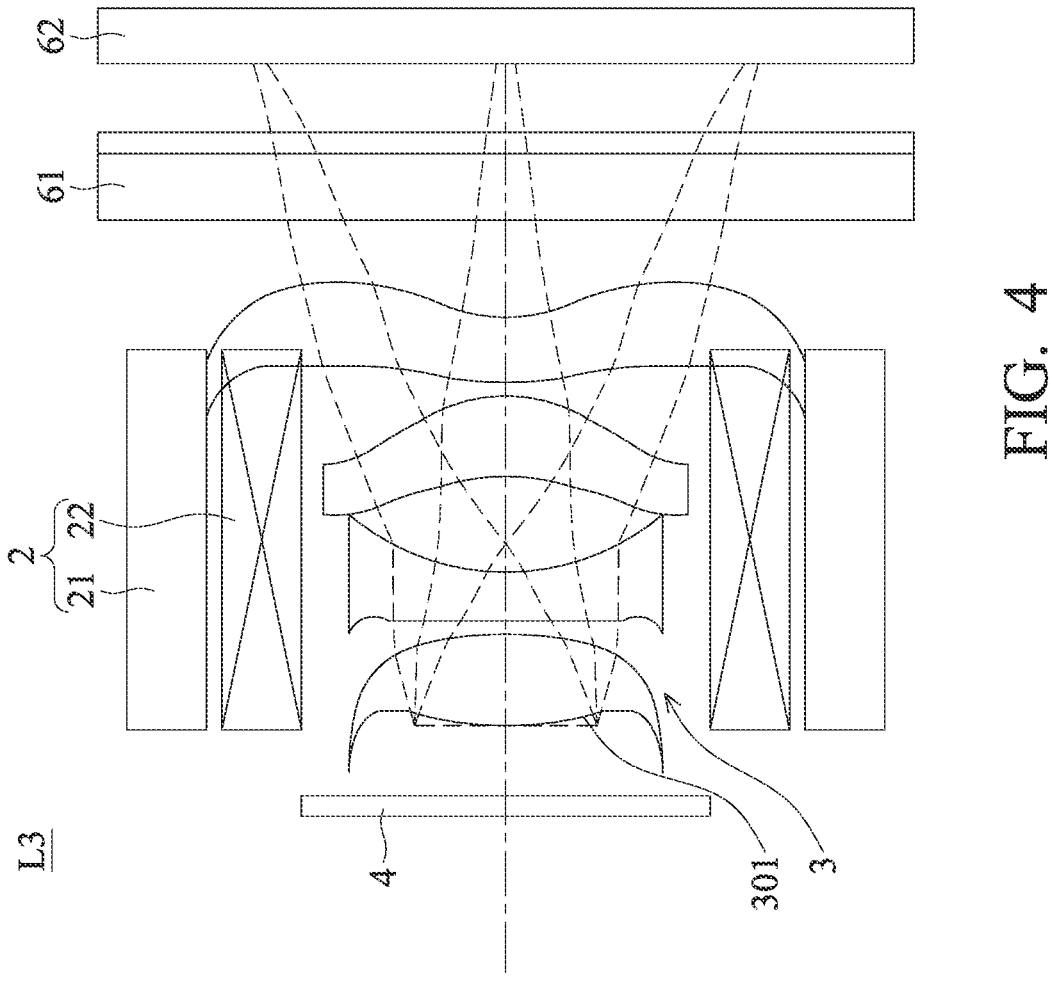
FIG. 4 shows an optical system of a third embodiment of the invention.

FIG. 4 shows an optical system of a third embodiment of the invention. With reference to FIG. 4, the optical system L3 of the third embodiment of the invention comprises an actuating unit 2 and a lens unit 3. The actuating unit 2 comprises a magnetic element 21 and an actuating coil 22. In this embodiment, the optical system L3 further includes an infrared filter 61 and an image sensor 62. The lens unit 3 comprises an inlet side 301. When the metalens 4 is in the second position, the metalens 4 covers the inlet side 301.

With reference to FIGS. 2A, 2B and 4, in the second and third embodiment of the invention, the metalens 4 is adapted to correspond to the inlet side 301 to provide a diffraction compensation effect, and improves the image quality of the optical system. Commonly, the inlet side 301 of the lens unit 3 has decreased size, and the size of the metalens 4 is therefore decreased.

Figure 5:
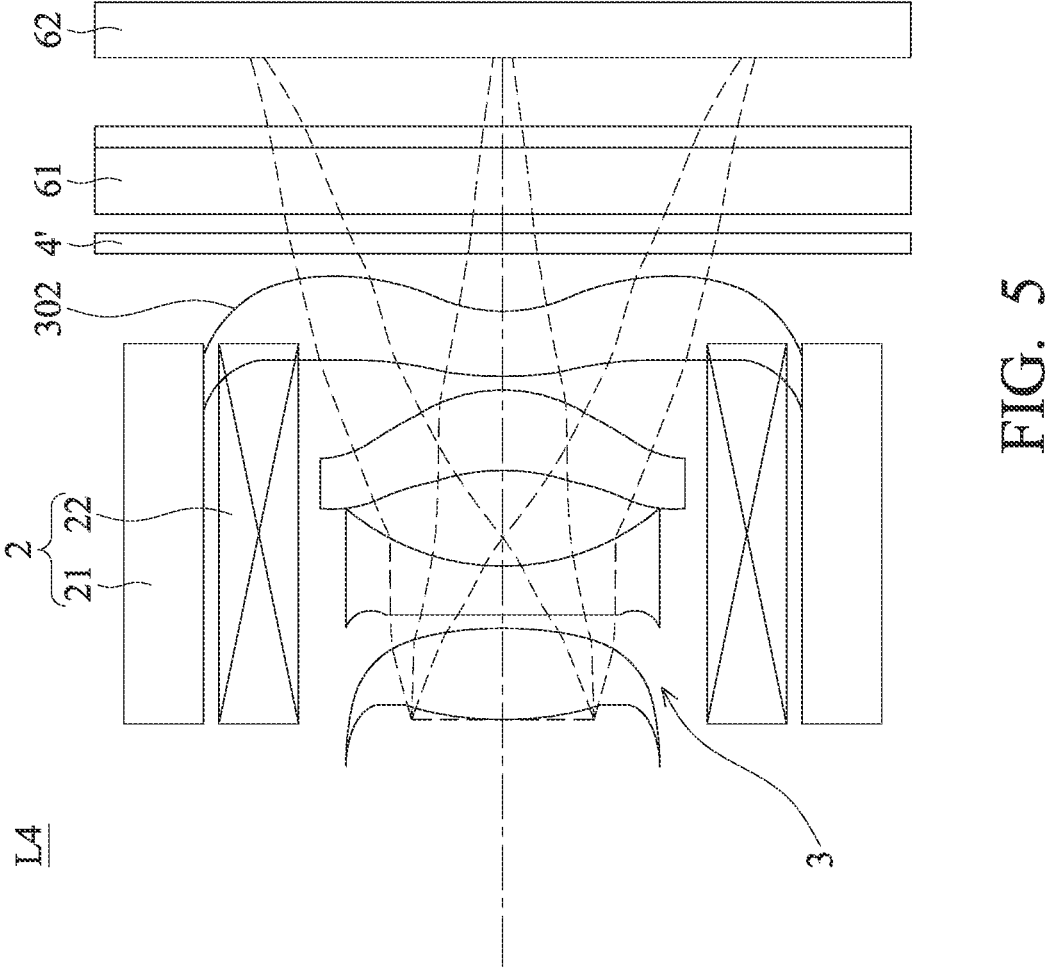
FIG. 5 shows an optical system of a fourth embodiment of the invention.

FIG. 5 shows an optical system of a fourth embodiment of the invention. With reference to FIG. 5, in this embodiment, the lens unit 3 of the optical system L4 comprises an outlet side 302. When the metalens 4' is in the second position, the metalens 4' covers the outlet side 302. When the metalens 4' is in the second position, the metalens 4' is located between the image sensor 62 and the lens unit 3. Particularly, the metalens 4' is located between the infrared filter 61 and the lens unit 3. In this embodiment of the invention, the metalens 4' is adapted to correspond to the outlet side 302 to provide a diffraction compensation effect, and improves the image quality of the optical system. Commonly, the outlet side 302 of the lens unit 3 has increased size, and the size of the metalens 4' is therefore increased.

Figure 6:
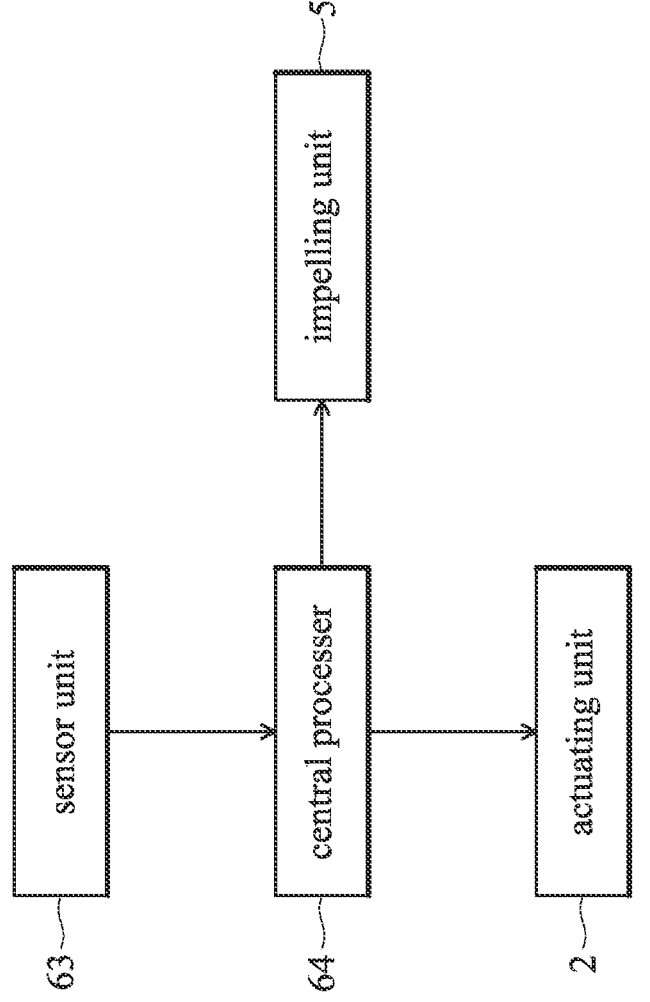
FIG. 6 is a block diagram of the optical system of the embodiment of the invention.

FIG. 6 is a block diagram of the optical system of the embodiment of the invention. With reference to FIG. 6, in one embodiment of the invention, the optical system further comprises a sensor unit 63 and a central processer 64. The sensor unit 63 is adapted to detect a tremor amplitude and to provide a sensing signal. The central processer 64 activates the actuating unit 2 according to the sensing signal to move the lens unit. When the central processer 64 activates the actuating unit 2, the central processer 64 also activates the impelling unit 5 to move the metalens 4 from the first position to the second position. In one embodiment, the sensing unit includes a gyro element.

Figure 7:
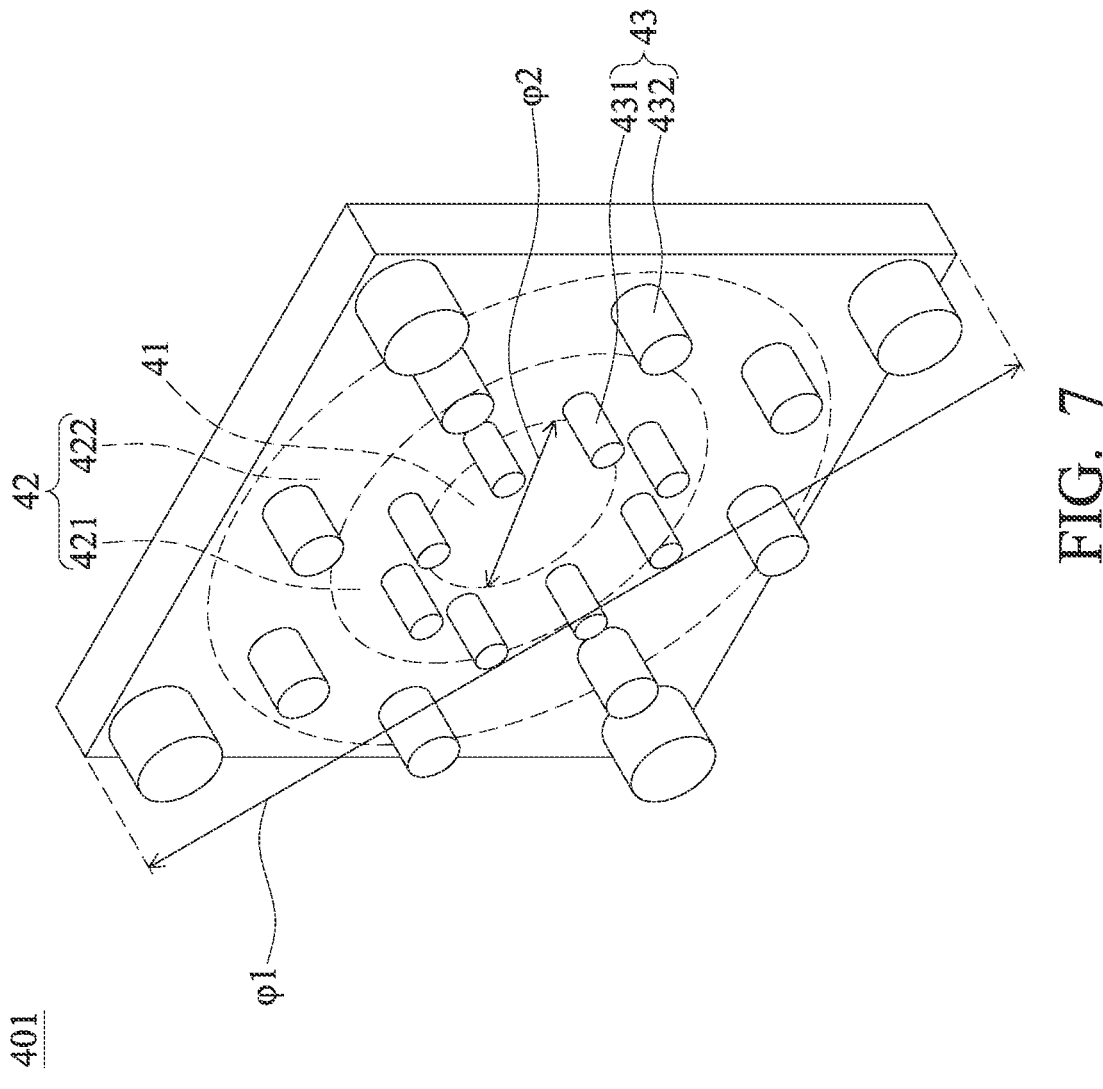
FIG. 7 shows the details of the metalens of an embodiment of the invention.

FIG. 7 shows the details of the metalens of an embodiment of the invention. With reference to FIG. 7 the metalens 401 comprises a central area 41, a peripheral area 42 and a plurality of metastructures 43. The peripheral area 42 surrounds the central area 41. The metastructures 43 are selectively disposed in the central area 41 or the peripheral area 42. In one embodiment, the peripheral area 42 means the area out of the central area 41. The disclosure is not meant to restrict the invention. In this embodiment, the metastructures 43 are only located in the peripheral area 42.

With reference to FIGS. 4 and 7, in one embodiment, the actuating unit 2 moves the lens unit 3 to provide an anti-shake optical compensation in a central compensation way. The metastructures 43 are only disposed in the peripheral area 42 to provide a diffraction compensation effect, and improves the image quality of the optical system.

With reference to FIG. 7, in one embodiment, the peripheral area 42 comprises a first annular area 421 and a second annular area 422. The first annular area 421 surrounds the central area 41. The second annular area 422 surrounds the first annular area 421. The metastructures 43 comprise a plurality of first metastructures 431 and a plurality of second metastructures 432. The first metastructures 431 are disposed in the first annular area 421. The second metastructures 432 are disposed in the second annular area 422. The compensation ability of the first metastructures 431 differs from the compensation ability of the second metastructures 432.

With reference to FIG. 7, in one embodiment, the metastructures 43 are cylindrical. However, the disclosure is not meant to restrict the invention. For example, in other embodiments, the metastructures can be cube or pyramid shaped.

With reference to FIG. 7, in one embodiment, the height of each first metastructure 431 is the same with the height of each second metastructure 432. The width (diameter) of each first metastructure 431 is smaller than the width (diameter) of each second metastructure 432. Therefore, the compensation ability of the first metastructures 431 differs from the compensation ability of the second metastructures 432. However, the disclosure is not meant to restrict the invention. For example, in another embodiment, the arrangement density of the first metastructures is smaller than the arrangement density of the second metastructures, and thus the compensation ability of the first metastructures 431 differs from the compensation ability of the second metastructures 432.

Figure 8:
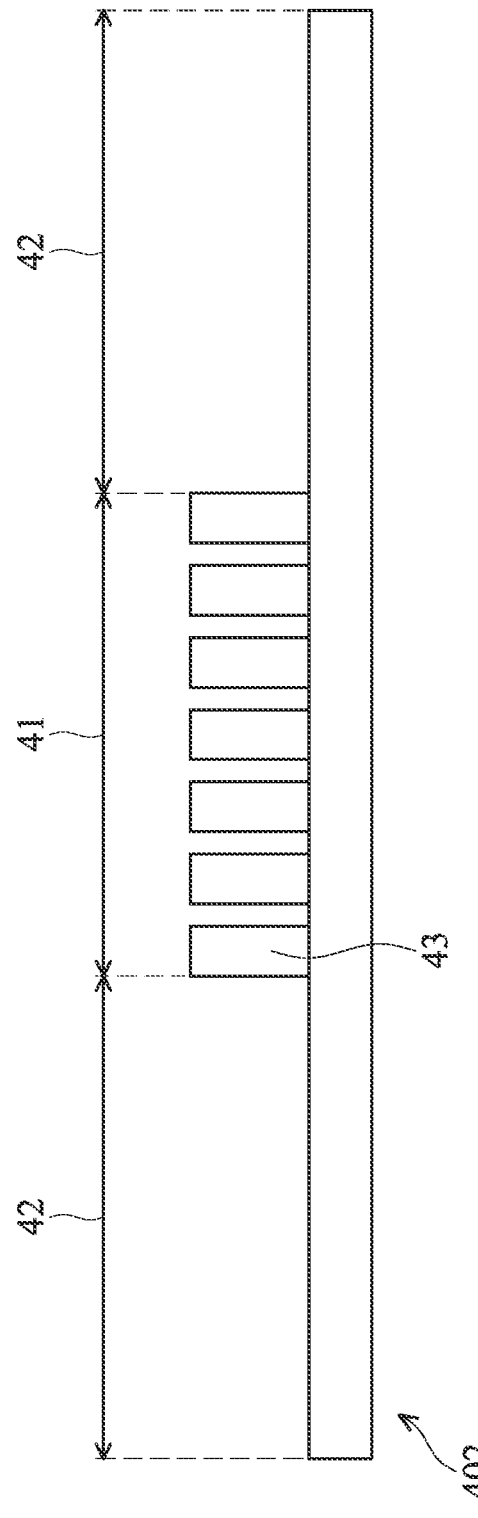
FIG. 8 shows a metalens of another embodiment of the invention.

FIG. 8 shows a metalens of another embodiment of the invention. With reference to FIG. 8, in another embodiment, the actuating unit moves the lens unit to provide an anti-shake optical compensation in a peripheral compensation way, and the metastructures 43 of the metalens 402 are only disposed in the central area 41.

With reference to FIG. 7, in one embodiment, a diameter $\varphi2$ of the central area 41 is $\frac{2}{5}$ of a diagonal length $\varphi1$ of the metalens. The disclosure is not meant to restrict the invention. In another embodiment, the diameter $\varphi2$ of the central area 41 can be $\frac{1}{5}$~$\frac{3}{5}$ of the diagonal length $\varphi1$ of the metalens.

FIG. 9 is a flowchart of an anti-shake optical compensation method of the embodiment of the invention. With reference to FIG. 9, the anti-shake optical compensation method of the embodiment of the invention includes the following steps. First, an optical system is provided. The optical system comprises a fixed unit, an actuating unit, a lens unit, a metalens, a sensing unit, a impelling unit and a central processer, the actuating unit is connected to the fixed unit, and the lens unit is adapted to be moved by the actuating unit relative to the fixed unit (S1). Next, the sensing unit detects a tremor amplitude and provides a sensing signal (S2). Then, the central processer activates the actuating unit according to the sensing signal to move the lens unit, wherein when the central processer activates the actuating unit, the central processer also activates the impelling unit to move the metalens onto a light path of the lens unit (S3).

With reference to FIG. 9, in one embodiment, the anti-shake optical compensation method further comprises the step of activating an anti-shake state, wherein the sensing unit detects the tremor amplitude (S21). Particularly, in a dynamic photography situation, the user can activate the anti-shake state. In a still photography situation, the user can shut down the anti-shake state.

The metalens of the optical system of the embodiment of the invention provides the diffraction compensation effect, and improves the image quality of the optical system. Particularly, when the tremor amplitude is over a default value and the central processer moves the lens unit to provide an optical compensation effect, and the metal lens is moved to the light path of the lens unit simultaneously to provide the diffraction compensation effect, and the image quality of the optical system is therefore improved. When the tremor amplitude is not over a default value (no compensation requirement), the metal lens is out of the light path of the lens unit, and the image quality of the optical system is prevented from influenced by the metal lens. Utilizing the optical system of the embodiment of the invention, the size and the cost of the lens unit and its peripheral components are reduced, and the production requirements of thinness and low cost are achieved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical system, comprising:
a fixed unit;
an actuating unit, connected to the fixed unit;
a lens unit, adapted to be moved by the actuating unit relative to the fixed unit;
a metalens, wherein the metalens is adapted to be moved between a first position and a second position relative to the lens unit, and when the metalens is in the first position, the metalens is not on a light path of the lens unit, and when the metalens is in the second position, the metalens is on the light path of the lens unit; and
a metalens, wherein the metalens is adapted to be disposed on a light path of the lens unit, the metalens comprises a plurality of metastructures, and the metastructures are disposed only in local areas of the metalens,
wherein the actuating unit moves the lens unit to provide an anti-shake optical compensation in a central compensation way, the metalens comprises a central area and a peripheral area, the peripheral area surrounds the central area, and the metastructures are only disposed in the peripheral area,
wherein the peripheral area comprises a first annular area and a second annular area, the first annular area surrounds the central area, the second annular area surrounds the first annular area, the metastructures comprise a plurality of first metastructures and a plurality of second metastructures, the first metastructures are disposed in the first annular area, the second metastructures are disposed in the second annular area, and a compensation ability of the first metastructures differs from a compensation ability of the second metastructures.

2. The optical system as claimed in claim 1, wherein the metalens is rotated between the first position and the second position.

3. The optical system as claimed in claim 2, further comprising a impelling unit, wherein the metalens is connected to the impelling unit, and the impelling unit is adapted to rotate the metalens between the first position and the second position.

4. The optical system as claimed in claim 3, wherein the impelling unit comprises a magnetic member and a coil, the metalens is connected to the magnetic member, the coil is adapted to apply a magnetic field to the magnetic member, and the magnetic member moves the metalens between the first position and the second position.

5. The optical system as claimed in claim 1, wherein the lens unit comprises an inlet side, and when the metalens is in the second position, the metalens covers the inlet side.

6. The optical system as claimed in claim 1, wherein the lens unit comprises an outlet side, and when the metalens is in the second position, the metalens covers the outlet side.

7. The optical system as claimed in claim 6, further comprising an image sensor, wherein when the metalens is in the second position, the metalens is located between the image sensor and the lens unit.

8. The optical system as claimed in claim 1, further comprising an impelling unit, a sensor unit and a central processer, wherein the metalens is connected to the impelling unit, the sensor unit is adapted to detect a tremor amplitude and to provide a sensing signal, and the central processer activates the actuating unit according to the sensing signal to move the lens unit, and when the central processer activates the actuating unit, the central processer also activates the impelling unit to move the metalens from the first position to the second position.

9. The optical system as claimed in claim 1, wherein a height of each first metastructure is the same with a height of each second metastructure.

10. The optical system as claimed in claim 9, wherein a width of each first metastructure is smaller than a width of each second metastructure.

11. The optical system as claimed in claim 1, wherein an arrangement density of the first metastructures is smaller than an arrangement density of the second metastructures.

12. An optical system, comprising:
a fixed unit;
an actuating unit, connected to the fixed unit;
a lens unit, adapted to be moved by the actuating unit relative to the fixed unit;
a metalens, wherein the metalens is adapted to be moved between a first position and a second position relative to the lens unit, and when the metalens is in the first position, the metalens is not on a light path of the lens unit, and when the metalens is in the second position, the metalens is on the light path of the lens unit; and
a metalens, wherein the metalens is adapted to be disposed on a light path of the lens unit, the metalens comprises a plurality of metastructures, and the metastructures are disposed only in local areas of the metalens,
wherein a diameter of the central area is ⅖ of a diagonal length of the metalens.

* * * * *